(12) United States Patent
Chen

(10) Patent No.: US 7,791,847 B2
(45) Date of Patent: Sep. 7, 2010

(54) FAULT-SENSING AND PROTECTING APPARATUS FOR SOFT START CIRCUIT OF INVERTER AND METHOD FOR THE SAME

(75) Inventor: Yu-Fang Chen, Taoyuan Shien (TW)

(73) Assignee: Delta Electronics, Inc., Taoyuan Shien (TW)

( * ) Notice: Subject to any disclaimer, the term of this patent is extended or adjusted under 35 U.S.C. 154(b) by 489 days.

(21) Appl. No.: 11/965,963

(22) Filed: Dec. 28, 2007

(65) Prior Publication Data

US 2009/0168470 A1     Jul. 2, 2009

(51) Int. Cl.
*H02H 7/00* (2006.01)
*H02H 9/00* (2006.01)
(52) U.S. Cl. ....................................................... 361/18
(58) Field of Classification Search .................... 361/18
See application file for complete search history.

(56) References Cited

U.S. PATENT DOCUMENTS

| | | | | |
|---|---|---|---|---|
| 4,001,663 | A | * | 1/1977 | Bray .............................. 363/37 |
| 4,709,320 | A | * | 11/1987 | Konopka ................... 363/56.01 |
| 5,491,405 | A | * | 2/1996 | Schroder-Brumloop et al. ............................ 323/299 |
| 6,683,443 | B2 | * | 1/2004 | Neild et al. ................... 323/282 |
| 6,756,601 | B2 | * | 6/2004 | Dodson, III .................. 250/551 |
| 2007/0153439 | A1 | * | 7/2007 | Matyas .......................... 361/90 |
| 2008/0252281 | A1 | * | 10/2008 | Yan et al. ...................... 323/288 |
| 2008/0259659 | A1 | * | 10/2008 | Choi et al. ..................... 363/50 |
| 2009/0185397 | A1 | * | 7/2009 | Forghani-zadeh et al. ...... 363/18 |

* cited by examiner

*Primary Examiner*—Ronald W Leja
(74) *Attorney, Agent, or Firm*—Chun-Ming Shih; HDLS IPR Services

(57) ABSTRACT

Fault-sensing and protecting apparatus for soft start circuit of inverter and method for the same are proposed. The soft start circuit of inverter includes a soft-starting resistor and a relay. The relay has a normally-open end connected to the soft-starting resistor in parallel. The fault-sensing and protecting apparatus for soft start circuit includes a central processing unit (CPU) and a photo coupler. The CPU is electrically connected to the inverter and an input end of the relay, respectively. The photo coupler includes a light emitting diode (LED) and a photo transistor. The LED is first electrically connected to a resistor in series and then electrically connected to the soft-starting resistor in parallel. The photo transistor is electrically connected to CPU. After the inverter starts to work, the CPU cuts out voltage applied to the inverter if the LED is lit. Therefore, the inverter can be prevented from damage.

11 Claims, 2 Drawing Sheets

FAULT-SENSING AND PROTECTING APPARATUS FOR SOFT START CIRCUIT OF INVERTER AND METHOD FOR THE SAME

BACKGROUND OF THE INVENTION

1. Field of the Invention

The present invention relates to a fault-sensing and protecting apparatus for soft start circuit, especially to a fault-sensing and protecting apparatus for soft start circuit used in an inverter.

2. Description of Prior Art

AC motor has been widely used as the mature of solid state inverter. The AC motor has the advantages of small rotor inertia, and excellent heat dissipation effect, and is extensively used in CNC machine and industrial robot as the progress of power semiconductor, microprocessor and control industry.

FIG. 1 shows a block diagram for a prior art AC motor connected to a wall socket power. An AC power such as 110Vac or 220Vac is supplied from a wall socket power 20 to a converter 30 for AC to DC conversion. The converted DC power is then sent to an inverter 40 for DC to AC inversion. The inverter 40 is controlled by a central processing unit (CPU) to obtain an AC power with required frequency and level. The AC power with required frequency and level is used to drive a motor 60.

The inverter uses a rectified and filtered DC power as input and therefore a soft start circuit with resistor is employed in the inverter for suppressing starting current. After starting, electrically-controllable switch unit such as relay, electromagnetic contact or SCR switch is used for bypassing the soft-start resistor. As shown in FIG. 2, the converter 30 is mainly composed of diode set 32 and filtering capacitor C. The wall socket power 20 is supplied to the inverter (not shown) after being rectified by the diode set 32 and filtered by the filtering capacitor C. When the voltage different between the filtering capacitor C and the wall socket power 20 is large, a charging current is considerable. A large starting current is generate to damage the diode set 32, burn out fuse or turn off a fuse-less switch. Therefore, the soft-start resistor is added to suppress the starting current. More particularly, a soft-start resistor R is provided in parallel with the rectifying and filtering circuit. The soft-start resistor R consumes considerable power when the circuit starts. Therefore, switch unit such as relay, electromagnetic contact or SCR switch is used for bypassing the soft start resistor. The switch unit and the soft-start resistor R are referred to as soft-start circuit. As shown in FIG. 2, the CPU controls the relay 72 to close the switch end 72A thereof (normally open end) for bypassing the soft start resistor R after the inverter starts.

However, the soft-start circuit malfunctions when printed circuit board (PCB) has line breaking problem, or the relay breakdowns. There is no protection circuit or malfunction detecting circuit for the soft-start circuit, and therefore the inverter has burning down risk after the soft-start circuit malfunctions. The soft-start resistor R has risk of burning down if the load is large (the load current is large). This happens when the soft-start resistor R is not bypassed. It is desirable to provide a protection circuit and malfunction detecting circuit for the soft-start circuit.

SUMMARY OF THE INVENTION

It is an object of the present invention to provide a fault-sensing and protecting apparatus for soft start circuit of inverter.

Accordingly, the present invention provides a fault-sensing and protecting apparatus for soft start circuit of inverter and method for the same. The soft start circuit of inverter includes a soft-start resistor and a relay. The relay has a normally-open end connected to the soft-start resistor in parallel. The fault-sensing and protecting apparatus for soft start circuit includes a central processing unit (CPU) and a photo coupler. The CPU is electrically connected to the inverter and an input end of the relay, respectively. The photo coupler includes a light emitting diode (LED) and a photo transistor. The LED is first electrically connected to a resistor in series and then electrically connected to the soft-start resistor in parallel. The photo transistor is electrically connected to CPU. After the inverter starts to work, the CPU cuts out voltage applied to the inverter if the LED is lit. Therefore, the inverter can be prevented from damage.

Moreover, the CPU can first send a signal to open-circuit the normally open end of the relay and then sends a short time current to the soft start resistor. When the LED is not lighted, the CPU can identify that the relay has permanent short circuit.

BRIEF DESCRIPTION OF DRAWING

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

DETAILED DESCRIPTION OF THE INVENTION

Figure 1:
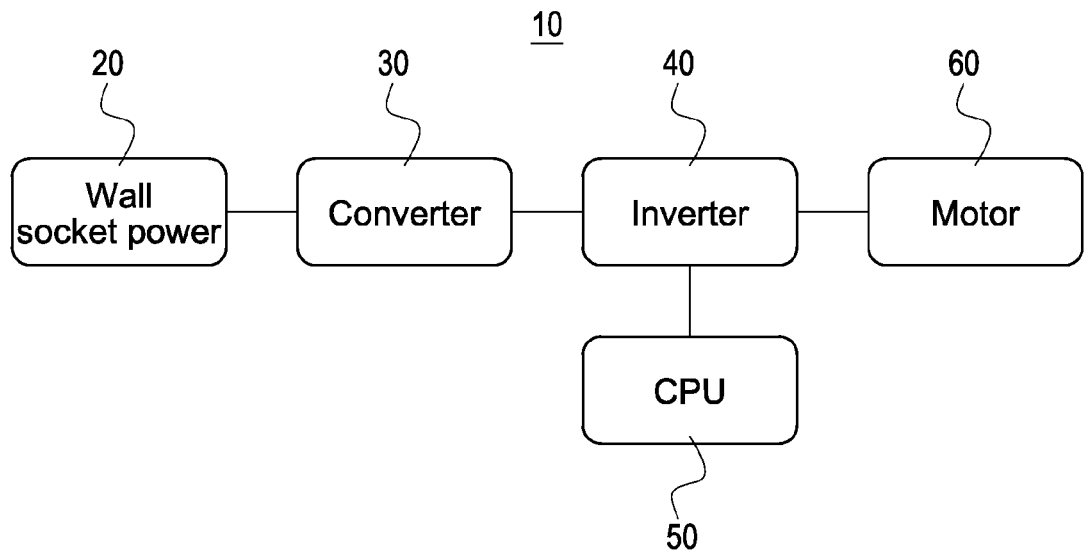
FIG. 1 shows a block diagram for a prior art AC motor system.
Figure 2:
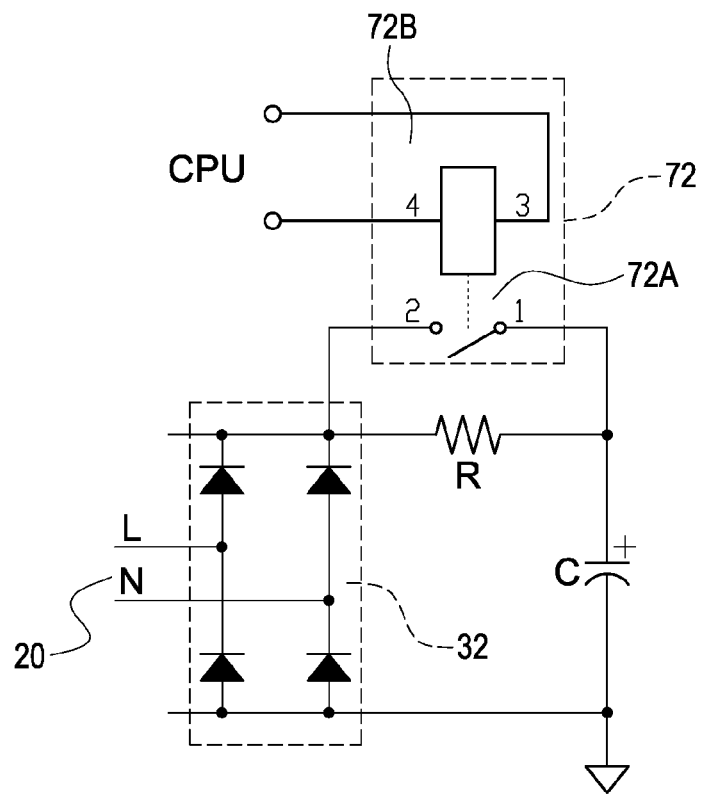
FIG. 2 shows a block diagram for a prior art soft start circuit.
Figure 3:
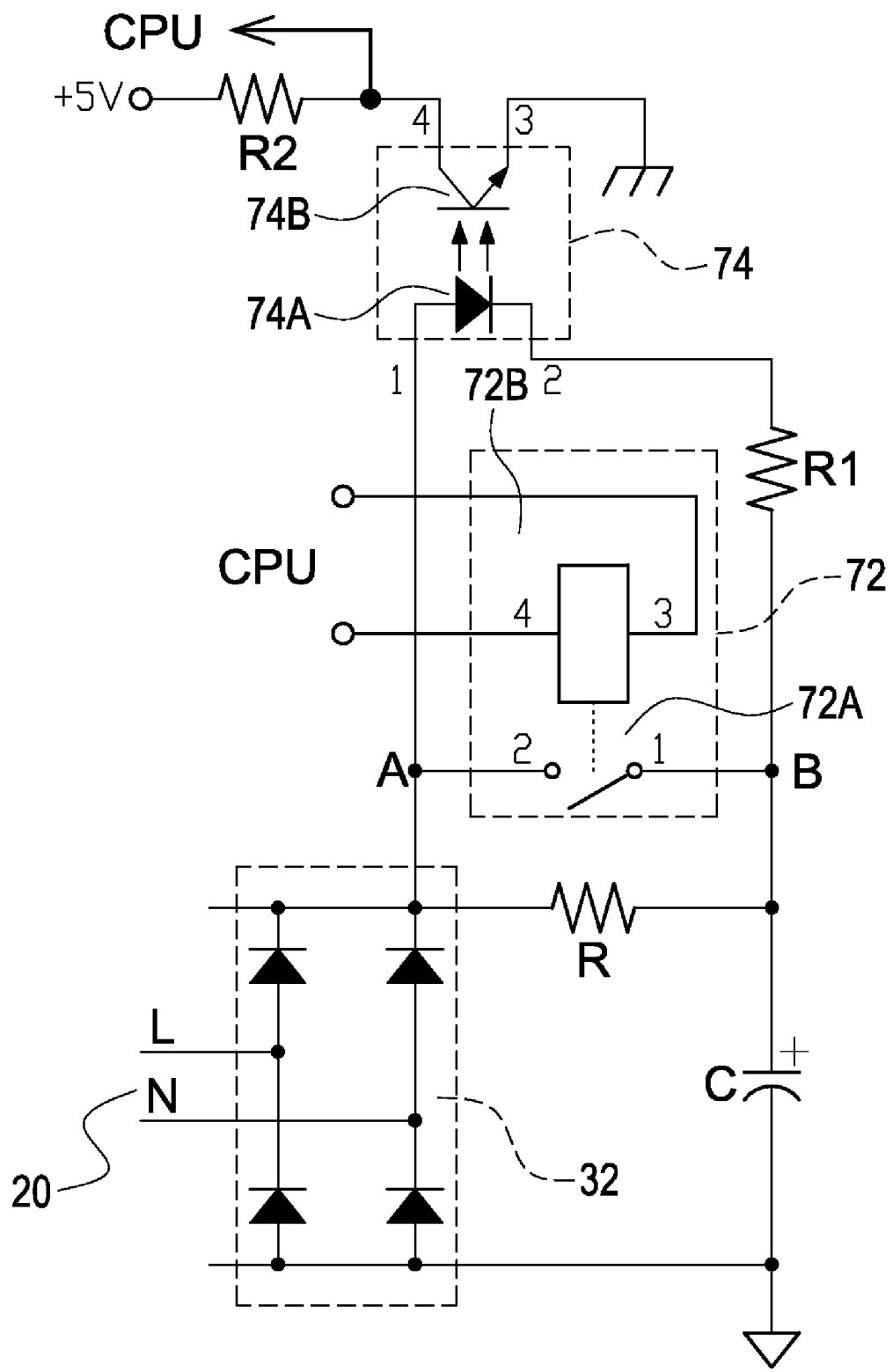
FIG. 3 shows a block diagram of the fault-sensing and protecting apparatus for soft start circuit according to the present invention.

With reference to FIG. 3, the fault-sensing and protecting apparatus for soft start circuit according to the present invention comprises a CPU (not labeled, which is the same as numeral 50 in FIG. 1), a photo coupler and a serial resistor R1. The fault-sensing and protecting apparatus is used for a soft start circuit of an inverter as shown in FIG. 2, wherein the fault-sensing and protecting apparatus protects the whole inverter system and senses fault in the relay of the soft start circuit. The components similar to or the same to those of FIG. 2 use the same numeral for clarity.

The photo coupler 74 comprises a light emitting diode (LED) 74A and a photo diode 74B, wherein the anode of the LED 74A is connected to a node A at one end of the soft-start resistor R, and the cathode of the LED 74A is connected to a node B at the other end of the soft-start resistor R through the serial resistor R1. The emitter of the photo diode 74B is connected to ground and the collector of the photo diode 74B is connected to the CPU, and also connected to a 5V power source through a resistor R2.

An electrically-controllable switch unit 72 employs, for example, a relay, a magnetic contact (MC), a silicon controlled rectifier (SCR), or a triggering bidirectional thyristor (TRIAC). One port of the electrically-controllable switch unit 72 provides normally open end or normally close end, while the other end of the electrically-controllable switch unit 72 is controlled by a controller, a CPU or other circuit to short-circuit (turn on) the normally open end or break off (turn off) the normally close end. Hereinafter the electrically-controllable switch unit 72 is exemplified as a relay, it should be noted the electrically-controllable switch unit 72 can employ other kinds of switches. When the wall-socket power supplies to the inverter system, the normally open end of the relay 72 is connected to the soft-start resistor R and keeps in normally open state such that most of the start current flows through the soft-start resistor R and the start current is limited. After a predetermined time, the CPU controls the input end 72B of the relay to short-circuit the normally open end 72A. Therefore, the current is prevented from flowing through the soft-start resistor R and power consumption can be prevented.

The fault-sensing and protecting apparatus for soft start circuit according to the present invention can be used to detect error for the relay in the soft start circuit. Generally, the relay error includes malfunction and permanent short circuit due to high current. The fault-sensing and protecting apparatus according to the present invention can be used to detect these two types of relay errors.

When the relay 72 shown in FIG. 3 malfunctions, all of load current flows through the soft-start resistor R. According to Ohm law, voltage difference across the soft-start resistor R increases. The voltage difference across the soft-start resistor R will trigger the photo coupler 74 after subtracting voltage drop across the serial resistor R1. The photo coupler 74 informs the CPU for warning or stop outputting power, thus protecting the soft-start circuit. For example, the CPU triggers a beeper for alarm, or triggers a flashing light for warning. Those ways of warning are well known art and not detailed here. More particularly, the LED 74A in the photo coupler 74 emits light when the voltage across the soft-start resistor R is excessive. The impedance of the photo diode 74B decreases after it is lighted by the LED 74A. The voltage at node 4 (collector voltage) of the photo coupler 74 also decreases. Therefore, the CPU can sense that the relay 72 shown in FIG. 3 has malfunction. The CPU can send alarm or stop function of the inverter system.

If the normally open end 72A of the relay 72 has permanent short circuit due to high current, CPU can sense the permanent short circuit by following steps. The CPU first sends a signal to turn off the relay 72, namely, to break off the relay 72. When the relay 72 has permanent short circuit, the relay 72 cannot be turned off by the signal. Afterward, the CPU sends a short-time current through the soft-start resistor R, wherein the short-time current is sufficiently large to produce a voltage difference across the soft-start resistor R. The voltage difference across the soft-start resistor R is sufficient to trigger the photo coupler 74. For example, the short-time current is a current of 10-50 mA with 0.3 to 0.5 mS duration. If the relay 72 has permanent short circuit, the short-time current flows through the normally open end 72A of the relay 72 and the photo coupler 74 is not triggered. Therefore, the CPU identifies that the relay 72 has permanent short circuit. This test can be conducted before the operation of the inverter system and the CPU can identify whether the relay 72 has permanent short circuit.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A fault-sensing and protecting apparatus for sensing fault in a soft start circuit of an inverter the soft start circuit comprising a soft start resistor and an electrically controllable switch unit with a normally open end, and the soft start resistor being in parallel with the normally open end, the fault-sensing and protecting apparatus comprising:

a central processing unit (CPU) electrically connected to the inverter and an input port of the electrically controllable switch unit; and a photo coupler comprising a light emitting diode (LED) and a photo diode, wherein the LED is electrically connected to a serial resistor and then connected to the normally open end in parallel, wherein the photo diode is electrically connected to the CPU;

wherein the CPU is configured to stop outputting voltage to the inverter after the inverter starts and the normally open end is controlled by the CPU to become short circuited and the CPU senses signal from the photo coupler.

2. The fault-sensing and protecting apparatus as in claim 1, wherein an anode of the LED is electrically connected to one end of the soft start resistor, and a cathode of the LED is electrically connected to the other end of the soft start resistor through the serial resistor.

3. The fault-sensing and protecting apparatus as in claim 1, wherein the photo diode is to a DC voltage through a resistor.

4. The fault-sensing and protecting apparatus as in claim 1, wherein the CPU is configured to send an alarm after the inverter starts and the normally open end is controlled by the CPU to be short circuited and the CPU senses signal from the photo coupler.

5. The fault-sensing and protecting apparatus as in claim 1, wherein the electrically controllable switch unit is one of a relay, a magnetic contact (MC), a silicon controlled rectifier (SCR), and a triggering bidirectional thyristor (TRIAC).

6. A method for sensing fault and protecting a soft start circuit in an inverter, the inverter receiving a wall socket power through a rectifying and filtering circuit, the rectifying and filtering circuit being connected to a soft start resistor in serial, the method comprising:

providing an electrically controllable switch unit with a normally open end connected to the soft start resistor in parallel, the electrically controllable switch unit comprising an input port to receive an external control signal to turn on or turn off the normally open end;

providing a photo coupler, which comprises a light emitting diode (LED) and a photo diode, wherein the LED is electrically connected to a serial resistor in series and then electrically connected to the soft start resistor in parallel; and stopping sending voltage to the inverter after the inverter starts, and normally open end is short circuited and a light from the LED is sensed.

7. The method as in claim 6, further comprising:
raising an alarm when a light from the LED is sensed.

8. The method as in claim 6, further comprising:
sending a signal to open circuit the normally open end;
sending a short-time current through the soft start resistor; and
identifying that the electrically controllable switch unit has permanent shot circuit when a light from the LED is sensed.

9. The method as in claim 6, wherein the electrically controllable switch unit is one of a relay, a magnetic contact (MC), a silicon controlled rectifier (SCR), and a triggering bidirectional thyristor (TRIAC).

10. The method as in claim 8, wherein the short-time current has magnitude of 10-50 mA.

11. The method as in claim 10, wherein the short-time current has duration of 0.3-0.5 ms.

* * * * *